UNITED STATES PATENT OFFICE.

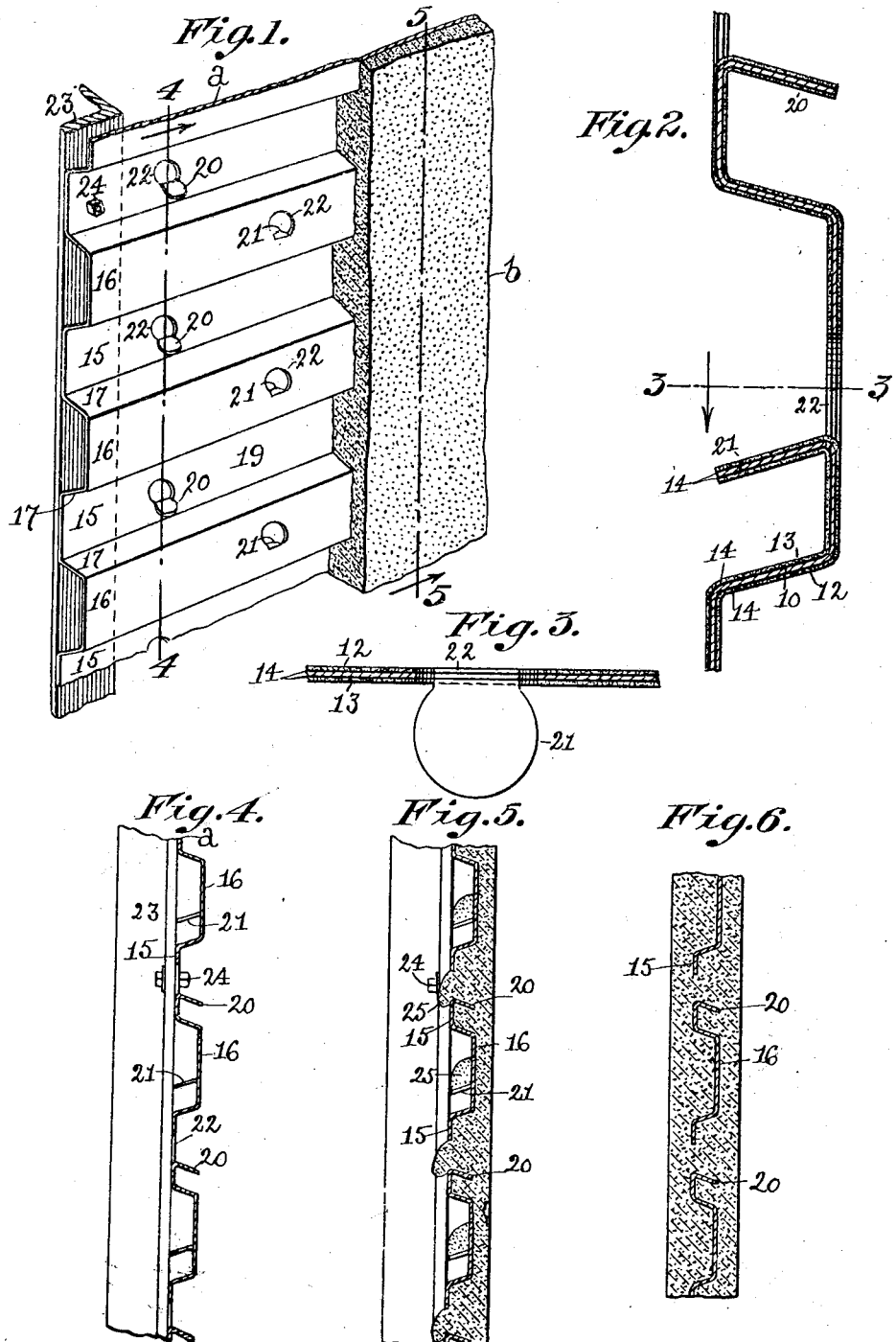

PEREZ M. STEWART, OF NEW YORK, N. Y., ASSIGNOR TO DOUGLAS B. STEWART, OF NEW YORK, N. Y.

COMPOSITE BUILDING STRUCTURE.

1,068,512.

Specification of Letters Patent. Patented July 29, 1913.

Application filed February 12, 1912. Serial No. 676,993.

*To all whom it may concern:*

Be it known that I, PEREZ M. STEWART, a citizen of the United States, residing in the borough of Manhattan, city, county, and State of New York, have invented an Improvement in Composite Building Structures, of which the following description, in connection with the accompanying drawings, is a specification, like letters on the drawings representing like parts.

This invention relates to a composite structure especially designed and adapted for use in buildings, as a lath, and has for its object to provide a substantially rustless, non-condensing and sound-deadening and fire-resisting lath, which is of increased strength and rigidity and of minimum weight. For this purpose, I employ a corrugated sheet of asbestos protected metal, comprising a steel sheet covered with asphalt cement and layers or sheets of asbestos paper, and provide said corrugated sheet with trough-shaped valleys having side walls which diverge from the bottom walls of the valleys, said bottom walls having cut portions which extend away therefrom to form bonding lips or projections, which are embedded in the plastic material within the valleys and serve to metallically bond the latter to the corrugated sheet. The plastic material is further bonded to the corrugated sheet by the natural bond between the plastic material when moist and the asbestos sheets.

Figure 1 is a perspective view of a composite wall or structure embodying this invention, with a portion of the plastic material omitted. Fig. 2, an enlarged section of the asbestos protected corrugated metal sheet shown in Fig. 1. Fig. 3, a horizontal section on the line 3—3, Fig. 2. Fig. 4, a section on the line 4—4, Fig. 1. Fig. 5, a section on the line 5—5, Fig. 1, and Fig. 6, a modification in section to be referred to.

The composite structure comprises a member $a$ of corrugated metal and a member $b$ of plastic material, such as concrete. The member $a$ is an asbestos protected metal sheet (see Fig. 2), comprising a metal sheet 10, and layers 12, 13, of asbestos or like material secured to the opposite surfaces of the metal sheet 10 by layers 14 of asphalt or like adhesive material. The member $a$ is provided with corrugations having substantially wide flat bottom walls 15, 16, located in substantially parallel planes and joined by inclined side walls 17, which form with said bottom walls trough-shaped valleys 19 having diverging side walls. The bottom walls 15, 16 have extended from them lips or projections 20, 21, which extend in opposite directions and may and preferably will be formed by cutting openings 22, preferably in the bottom walls, and bending the cut portions at an angle to said walls. The projections or lips 20, 21, may be of any suitable shape and preferably substantially circular as herein represented, (see Fig. 3), and they may and preferably will be bent so as to incline with relation to said bottom walls.

The corrugated member $a$ is secured to suitable uprights or supports 23, only one of which is shown, by bolts 24 or otherwise, and are arranged with the valleys running at an angle to said uprights and preferably horizontally thereto. The plastic member $b$ is then applied by a trowel or other means, to one side of the corrugated member as shown in Figs. 1, 4 and 5, or to both sides thereof as shown in Fig. 6. The plastic material is applied in such quantity as to fill the valleys 19 and form a plastic layer beyond the bottom walls of the valleys, and the material which fills the valleys also passes through the openings 22, as shown in Fig. 5 to form a plastic bond 25 for uniting the plastic member to the corrugated metal member, while at the same time, the plastic member is metallically bonded to the metal member by the lips or projections 20, 21, which bond may be strengthened by making the lips or projections so that the plastic material is interposed between the metal sheet and the outer end of the lips.

From the above description, it will be seen, that a composite structure of a corrugated asbestos protected metal member and a member of plastic material is formed, in which the members are bonded together within the valleys by portions of said members and without the use of extraneous members, and also by the natural bond between the plastic material when moist and the asbestos sheets, whereby a fire-resisting wall or partition of light weight may be obtained at a minimum expense. Furthermore the asbestos layers of the asbestos protected metal serve to increase the fire-resisting properties of the structure, and also render the structure rustless as the corrugated metal sheet is protected from the attack of moisture, gases, etc. It will be observed that the metallic bonding of the plastic member to the corrugated metal member is effected within the valleys of the said corrugated member and as a result the plastic layer can be made of reduced thickness beyond or outside of the bottom walls of the valleys, whereby the cost and weight of the composite structure may be materially reduced.

By making the corrugated sheet with trough-shaped valleys having side walls which diverge from the bottom walls of said valleys, the layers of asbestos and asphalt which cover the metal sheet are not broken or cracked at the bends or corners in the metal sheet, as the said bends or corners are made round and not sharp, and as a result a rustless lath is obtained which is strong and rigid.

Claims:

A composite building structure composed of a corrugated metal member having trough-shaped valleys provided with substantially parallel bottom walls and diverging side walls connecting said bottom walls and having bonding devices integral with said walls, a waterproofing and insulating cement covering the surfaces of said metal member, layers of asbestos fabric affixed to the opposite surfaces of said metal member by said cement, and a member of plastic material enveloping the bonding devices in the valleys on one side of said metal member and united to the asbestos fabric on one surface of the metal member and on both surfaces of the bonding devices in the valleys of said surface by a natural bonding of the fibers of the asbestos fabric with the plastic material, substantially as described.

In testimony whereof, I have signed my name to this specification in the presence of two subscribing witnesses.

PEREZ M. STEWART.

Witnesses:
JAS. H. CHURCHILL,
J. MURPHY.

---

Copies of this patent may be obtained for five cents each, by addressing the "Commissioner of Patents, Washington, D. C."